United States Patent Office 3,790,459
Patented Feb. 5, 1974

3,790,459
PROCESS FOR REMOVING HYDROGEN SILANES FROM CHLOROSILANES
Hans-Joachim Kotzsch, Rheinfelden, and Hans-Joachim Vahlensieck, Wehr, Germany, assignors to Dynamit Nobel AG, Troisdorf, Germany
No Drawing. Filed Sept. 28, 1970, Ser. No. 76,253
Claims priority, application Germany, Sept. 27, 1969, P 19 48 911.3
Int. Cl. B01j 1/10; C01b 33/08
U.S. Cl. 204—157.1
8 Claims

ABSTRACT OF THE DISCLOSURE

Purification of trichlorosilane compositions which also contain higher hydrogen content silanes and may further contain tetrachlorosilane by admixing and reacting the composition with elemental chlorine at −30° C. to 300° C. for a time sufficient to convert substantially all of said higher-hydrogen silanes to tri- or tetrachlorosilane, and then recovering the trichlorosilane, possibly by distillation.

---

The invention relates to a process for purifying readily or spontaneously ignitable mixtures of hydrogen silanes.

Trichlorosilane is a valuable technical product that is increasingly commanding interest, for example in the fields of silicones, silane adhesives, building protection agents, polymerization catalysis, reducing agents, and the production of semiconductor silicon for the electronics industry.

It is commercially prepared by reaction of elementary silicon with hydrogen chloride, some other hydro- and chlorosilanes being likewise formed as by-products (cf. H. Rotzsche, Zeitschrift für anorganische und allgemeine Chemie 324 (1936), 197–201).

Unfortunately, the handling of technical trichlorosilane involves an appreciable safety hazard. Although among the series of silicon hydrides of general formula

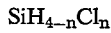

$$SiH_{4-n}Cl_n$$

in which $n$ stands for a whole number between 0 and 3, the only known substance which ignites spontaneously with the oxygen of the air is monosilane, while the chlorine derivatives of monisilane—monochlorosilane, dichlorosilane and trichlorosilane—are regarded as not spontaneously ignitable (according to A. Stock and C. Somieski, cf. Ber. dtsch. Chem. Ges. 52 (1919), 695, 724), the latter compounds, even at ordinary temperature, have often been known to ignite spontaneously, causing fire or explosion, often with disastrous consequences (cf. e.g. also Gmelins Handbuch der anorganischen Chemie 15 Si(B) 701). Thus for example W. C. Schumb (Chem. Rev. 31 (1942), 587, 592) reports that the explosion, without apparent cause, of a bottle of trichlorosilane standing undisturbed at room temperature.

No complete explanation of this behavior has yet been found. Study of the thermal and photochemical oxidation of the chlorine derivatives of monosilane by H. J. Emeleus and A. J. E. Welch, of cf. J. Chem. Soc. (London) (1939) (1928–1937), shows that the ignitability of silane mixtures with oxygen increases sharply with the number of hydrosilicon groups in the molecule.

In a study by R. Muller, H. Witte and H. Beyer (J. prakt. Chemie 4/31 (1-2, 1966) 1–6), it has also been shown that technical trichlorosilane containing some dichlorosilane may be ignited by impact or concussion, while pure trichlorosilane is not so ignited.

In order to reduce the high risk in handling and storing trichlorosilane, therefore, it is important to remove the more highly hydrogenated silanes—dichlorosilane, mono- chlorosilane and silane—that are formed as by-products in the conventional large-scale industrial synthesis of trichlorosilane and tetrachlorosilane by reaction of elementary silicon with hydrogen chloride.

The obvious expedient of separatory distillation, owing to the attendant concentration of the hazardous higher-hydrogenated silanes, represents an increased safety hazard, particularly since these are low-boiling substances. Furthermore, it requires an additional operation to render the dangerous wastes resulting from distillation sufficiently for disposal since there are as yet no industrial applications for these products.

It is an object of this invention to provide a technique for avoiding these explosive and/or inflammable conditions.

It is another object of this invention to provide a novel technique for purifying chlorosilane mixtures.

Other and additional objects will become apparent from a consideration of this entire specification including the claims thereof.

It has now been found, in accord with and fulfilling these objects, that the difficulties described above may be eliminated in simple manner by carrying out the chlorosilane production process in a particularly advantageous manner. This process comprises mixing anhydrous chlorine preferably at a temperature in the range from −30° C. to +300° C., in with the chlorosilane product produced by the reaction of hydrogen chloride and silicon to produce a product comprising tri- and tetrachlorosilane and having higher hydrogen containing silane by-products, in a quantity corresponding to 1 to 2 times the quantity stoichiometrically required for reaction of the total silicon hydrogen bonds of the higher hydrogen containing silanes to be chlorinated, reacting the mixture, and then purifying the reaction product in known manner. The purification and resolution of the product so produced may be accomplished in known manner, for example by distillation.

The process according to the invention leads to the desired result since it has been found that the higher-hydrogenated members of the hydro-silicon series which readily or spontaneously ignite namely diclorosilane, monochlorosilane and silane, particularly when present in mixtures with lower—or non-hydrogenated silanes, that is for example with trichlorosilane and/or tetrachlorosilane, are considerably more rapidly chlorinated than trichlorosilane.

This process therefore offers the advantage over the prior art that by simple partial post-chlorination, the especially hazardous hydrogen silanes, which exist in technical trichlorosilane and such is produced, can be readily eliminated by converting them into the valuable products trichlorosilane and/or tetrachlorosilane, with no need to first concentrate them. In this way, a technical trichlorosilane is obtained in which the hazard of uncontrolled spontaneous combustion in air has been substantially eliminated and which can be handled safely. Of course, as in the past, and as in the case of all silicon-chlorine compounds, moisture must always be excluded because of the known hydrolyzing property of the chlorosilanes. Advantageously, anhydrous chlorine is used. The dew point of the chlorine used is not critical. The ranges of applicable dew point at a function only of economic feasibility.

It is already known, that hydrogen silanes will react with elementary chlorine to replace the hydrogen substituents on the silicon by chlorine substituents while liberating hydrogen chloride. It is also known that such reactions are generally promoted by the action of heat or light (photons) for example ultraviolet light. The selective effect of partial chlorination on the higher-hydrogenated members of the $SiH_{4-n}Cl_n$, especially when mixed with trichlorosilane and/or tetrachlorosilane, however, is surprising and was not suggested by the prior art of this field.

To practicing the process, a mixture of silanes, for example silane, monochlorosilane, dichlorosilane, trichlorosilane and tetrachlorosilane, is treated with at least as much elemental chlorine as is stoichiometrically required to react all silicon-hydrogen bonds to be chlorinated in the silanes, that is, all hydrogens over and above one hydrogen per silane, or in other words, all but those in the trichlorosilane present.

The average quantity of chlorine required may be calculated in simple manner from the composition of the crude silane mixture to be processed. Preferably the said quantity should not be above 100% in excess of stoichiometry. The chlorine added is consumed in a few minutes. Immediately thereafter, the reaction mixture may be resolved and purified by distillation if required. It is then found that substantially all higher-hydrogenated silanes present in the starting silane mixture have been completely reacted, and that the trichlorosilane obtained, now quite free from the hazardous higher-hydrogenated silanes, may be handled even in air with comparative safety. Often too, some tetrachlorosilane will be recovered, which may also be utilized to technical and economic advantage.

The process according to the present invention may be carried out preferably either at low temperature for example at about —30° C., or else at elevated temperatures, for example up to about +300° C. More preferably, however, the process is carried out in the temperature range of about 0° and 90° C., but these temperature limits are not critical, since the reaction will go forward in the manner specified even below —30° C. and above +300° C. It is possible to work either in liquid or in gaseous phase. Either atmospheric vacuum or over pressure conditions may be employed, although it is expedient to operate at standard pressure or under pressure conditions deviating only slightly from atmospheric pressure. The chlorination process of this invention will proceed in the dark as well as under illumination, for example with ultraviolet light. Light thus has no appreciable influence on the course of the process. In proportioning the chlorine, rapid and homogeneous mingling thereof with the above-mentioned silanes should be provided for. But the form in which the chlorine is added is not critical. The chlorine may be fed in undiluted form in the liquid or gaseous state of aggregation, or it may be fed to the process in diluted form, in any concentration, either mixed with gases, for example nitrogen, argon, hydrogen chloride, carbon dioxide, tetrachlorosilane vapor etc., or dissolved in inert liquid solvents. Such inert solvents are exemplified by tetrachlorosilane or hexachlorodisiloxane and the like.

According to the process of this invention, any chlorosilane mixture containing trichlorosilane and/or tetrachlorosilane may be treated. It is suitable for mixtures containing about 10 to nearly 100%, preferably 70–95% by weight of trichlorosilane in addition to the remainder of the mixture containing major quantities of tetrachlorosilane or dichlorosilane.

The process according to the invention may be carried out batchwise, intermittently or continuously. In intermittent operation, or by batch process, the calculated quantity of chlorine is mixed with the trichlorosilane composition and after permitting sufficient reaction time, the batch is distilled if required. In continuous operation, the chlorine is introduced into the mixture of silanes continuously in a mixing vessel or column for example. The weakly exothermic reaction sets in at once. It is advantageous to allow the product to react for residence times in the range of about 0.1 sec. to 1.0 min. The product is subjected to degassing, which may or may not be combined with further reaction if desired. The reaction product is then cooled and passed on for refining.

The process according to the invention is illustrated by the following examples, which however are not limiting on the scope of the invention.

EXAMPLE 1

The starting product used was a technical silane mixture of the following composition:

| | Wt. percent |
|---|---|
| Trichlorosilane | 89.8 |
| Dichlorosilane | 2.0 |
| Monochlorosilane | 0.2 |
| Silane | Traces |
| Tetrachlorosilane | 8.0 |

(a) Testing of safety properties of starting product (1) In a 50-ml. flask equipped with thermometer and a glass tube with drawn out tip as vapor outlet were placed 10 ml. of the above mixture with exclusion of moisture and air using argon or nitrogen at a temperature of —80° C. While heating to about 30° C. under the hood, the mixture began to boil. The rising silane vapor escaped through the nozzle tip and ignited spontaneously upon contact with air, burning to $SiO_2$ and HCl.

(2) In a small glass distillation column with a Reitmeier attachment installed behind a shielding wall, 50 ml. of the mixture was heated under nitrogen until full distillation set in. Then the receiver flask was exchanged for a 50-ml. flask filled with air. After receiving a few drops of distillate, the new receiving flask was destroyed by a violent explosion.

(b) Partial chlorination by the process of the invention 12.0 kg. of the technical silane mixture having the above composition was mixed, at room temperature, in a 10-liter flask having a reflux condenser, with a solution of 250 g. of elementary chlorine in 250 g. of tetrachlorosilane, corresponding to a proportion of about 1.1 mol. chlorine per mol of excess silicon-hydrogen bonds. The reaction initiated immediately forming hydrogen chloride which boiled off in about 15 minutes. The composition of the reaction product was:

| | Wt. percent |
|---|---|
| Dichlorosilane | 0.1 |
| Trichlorosilane | 89.6 |
| Tetrachlorosilane | 10.3 |
| Monochlorosilane | } Not found |
| Silane | |

About 11 kg. trichlorosilane and about 1.2 kg. tetrachlorosilane were separated by distillation with an inert protective atmosphere.

(c) Comparative testing of safety properties of trichlorosilane prepared by the process of the invention (1) The trichlorosilane prepared according to (b) was treated as under (a)1. The escaping trichlorosilane vapor did not ignite in air.
(2) The trichlorosilane prepared according to (b) was treated as under (a)2. The trichlorosilane dripping from the condenser into the air-cooled receiving flask showed no explosive tendency.

The distillation was then experimentally repeated without protective gas using an air-filled still. The whole of the trichlorosilane present in the apparatus was successfully distilled over with no fire or explosion.

EXAMPLE 2

The starting material is a mixture, easily ignited and highly explosive in air in the sense of (a)1 and (a)2, of the following composition:

| | Wt. percent |
|---|---|
| Trichlorosilane | 25 |
| Dichlorosilane | 70 |
| Monochlorosilane | 5 |
| Silane | Traces |

In a 2-liter flask equipped with an agitator, reflux condenser operated at −80° C., UV immersion lamp, internal thermometer and dipped gas delivery tube (mouth cross section approximately 1 mm.²), under a protective gas (nitrogen), 1.4 kg. of the above-identified starting material was introduced at −80° C. The flask was kept in an isopropanol bath maintained at 0° C. With rapid agitation and irradiation with ultraviolet light, over a 3-hour period 1065 g. (15 mols) of dry gaseous chlorine was introduced, evolving hydrogen chloride which escaped through the reflux condenser. The quantity of chlorine introduced corresponded to a mixture ratio of 1.53 mols chlorine per mol of excess silicon-hydrogen bond. When the hydrogen chloride had boiled off, the composition of the product as determined by gas chromatography was about 70 wt. percent trichlorosilane and about 30 wt. percent tetrachlorosilane. Distillation of this product yielded 1310 g. trichlorosilane and 520 g. tetrachlorosilane. The hazardous higher-hydrogen silanes in the starting product were not detected either in the product gas chromatogram or in the distilled trichlorosilane. They had, therefore, been completely chlorinated to the tri and tetrachloro state.

Testing of the trichlorosilane product obtained in Example 2 as under (a)1 and (a)2 showed that neither ignited spontaneously nor exploded in contact with air.

EXAMPLE 3

10 kg. of the starting material described in Example 1 was placed in a 10-liter flask equipped with an agitator, reflux condenser, ultraviolet immersion lamp, internal thermometer and dipping gas delivery tube (mouth cross section approximately 1 mm.²), under a protective gas (argon) at room temperature. With ultraviolet irradiation and agitation, 1420 g. of dry chlorine was introduced into the reactant in gaseous form over a period of one hour. The mixture came to a boil, and hydrogen chloride was formed which escaped through the reflux condenser. The chlorine introduced was equivalent to a mixture ratio of about 7 mols of chlorine per mol of excess silicon-hydrogen bond.

After the hydrogen chloride had boiled off, the composition of the product, determined by gas chromatography, was about 65 wt. percent trichlorosilane and about 35 wt. percent tetrachlorosilane. Distillation yielded about 6.9 kg. of trichlorosilane and about 3.7 kg. of tetrachlorosilane. Higher-hydrogen silanes were no longer found. The trichlorosilane so prepared could be handled safely.

EXAMPLE 4

A liquid starting material of the composition:

| | Wt. percent |
|---|---|
| Tetrachlorosilane | 85 |
| Trichlorosilane | 14.7 |
| Dichlorosilane | 0.3 |
| Monochlorosilane | Traces |
| Silane | | was continuously mixed with gaseous chlorine in a mixing nozzle with an ultraviolet lamp installed alongside. The chlorine was reacted completely.

The reaction product was taken off through a water-cooled tube and condensed completely in cooling traps at −80° C.

The reagents were supplied through flow meters, and 4 kg. of liquid silane mixture of the above composition and 106 g. of chlorine were reacted per hour. This is equivalent to a mixture ratio of about 12.5 mols of chlorine per mol of excess silicon-hydrogen bond.

After the hydrogen chloride had boiled off, the composition of the product, determined by gas chromatography, was about 10 wt. percent trichlorosilane and about 90 wt. percent tetrachlorosilane. Distillation of batches of about 12 kg. of product drawn off every 3 hours yielded about 1.2 kg. trichlorosilane and about 10.5 kg. tetrachlorosilane. The trichlorosilane obtained in this way could be handled safely.

What is claimed is:

1. The process of purifying and rendering substantially non-explosive a composition consisting essentially of a first component which is at least one member selected from the group consisting of trichlorosilane and tetrachlorosilane and a second component which is at least one member selected from the group consisting of dichlorosilane, monochlorosilane and silane, which process comprises admixing and reacting said composition with elemental chlorine in an amount sufficient to convert said second component but insufficient to further convert said trichlorosilane and trichlorosilane formed during the process, said amount of chlorine being not in excess of 100% of the stoichiometric amount required to convert said second component to trichlorosilane, at about −30 to +300° C. for a time sufficient to convert substantially all of said second component to said first component.

2. Process as claimed in claim 1 including distilling the reaction product to recover trichlorosilane.

3. Process as claimed in claim 1 wherein the reaction residence time is about 0.1 seconds to 1 minute.

4. Process as claimed in claim 1 wherein the reaction is carried out in the presence of ultraviolet light.

5. Process as claimed in claim 1 wherein the reaction is carried out in the liquid phase.

6. Process as claimed in claim 1 wherein the reaction is carried out in the vapor phase.

7. Process as claimed in claim 1 wherein the reaction is carried out batchwise.

8. In the process of producing chlorosilanes by reacting silicon and hydrogen chloride to produce a first reaction product consisting essentially of a first component which is at least one member selected from the group consisting of trichlorosilane and tetrachlorosilane and a second component which is at least one member selected from the group consisting of silane, monochlorosilane and dichlorosilane which first reaction product is spontaneously ignitable; the improvement which comprises admixing and reacting said first reaction product with at least a stoichiometric quantity of elemental chlorine, calculated upon the number of hydrogen silicon bonds more than present in trichlorosilane, at about −30 to +300° C., whereby said second component is substantially completely converted to said first component.

References Cited

UNITED STATES PATENTS 3,188,168   6/1965   Bradley et al. _____ 23—205 X
2,943,918   7/1960   Pauls _____ 23—366 X

OTHER REFERENCES

Bazant et al., "Organosilicon Compounds," vol. 1, pp. 130–133 (1965).

Hurd, "Chemistry of the Hydrides," 1952, pp. 108–109.

Rotzsche, "Zeitschrift Für Anoganische und Allgemeine Chemie," vol. 324, pp. 197–201 (1963).

Emeleus et al., "Advances in Inorganic Chemistry and Radiochemistry," vol. 3, 1961, pp. 211–217.

Sconce, "Chlorine," 1962, pp. 346–351, 357–358.

MILTON WEISSMAN, Primary Examiner

U.S. Cl. X.R.

423—342

PO-1050
(5/69)

UNITED STATES PATENT OFFICE
CERTIFICATE OF CORRECTION

Patent No. 3,790,459　　　　　　　　Dated February 5, 1974

Inventor(s) HANS-JOACHIM KÖTZSCH and HANS-JOACHIM VAHLENSEICK

It is certified that error appears in the above-identified patent and that said Letters Patent are hereby corrected as shown below:

Column 1, line 4, for "Kotzsch" read --Kötzsch --;
　　　　　line 61, delete "of" before "cf.".
Column 2, line 63, for "dew point at" read -- dew point is --.

Signed and sealed this 2nd day of July 1974.

(SEAL)
Attest:

EDWARD M. FLETCHER, JR.　　　　　C. MARSHALL DANN
Attesting Officer　　　　　　　　　Commissioner of Patents